(12) United States Patent
Smith

(10) Patent No.: US 7,452,142 B1  
(45) Date of Patent: Nov. 18, 2008

(54) DEVICE TO REDUCE ANGULAR DISTORTION IN PHOTOGRAPHY

(76) Inventor: Elizabeth Ruth Smith, 4137 Country Club Cir., Virginia Beach, VA (US) 23455

( * ) Notice: Subject to any disclaimer, the term of this patent is extended or adjusted under 35 U.S.C. 154(b) by 569 days.

(21) Appl. No.: 11/179,435

(22) Filed: Jul. 12, 2005

Related U.S. Application Data

(60) Provisional application No. 60/654,143, filed on Feb. 18, 2005.

(51) Int. Cl.
G03B 17/00 (2006.01)
G01B 13/02 (2006.01)

(52) U.S. Cl. .................. 396/422; 33/266
(58) Field of Classification Search .......... 396/419, 396/422, 420; 33/266, 483, 494, 474, 476, 33/679.1

See application file for complete search history.

(56) References Cited

U.S. PATENT DOCUMENTS

| | | | | |
|---|---|---|---|---|
| 2,213,467 A | | 9/1940 | Greenspoon | |
| 2,667,110 A | * | 1/1954 | Youtcheff | 396/329 |
| 2,667,825 A | * | 2/1954 | Nicholas | 396/428 |
| 2,848,923 A | * | 8/1958 | Diefenbach | 355/74 |
| 3,340,784 A | * | 9/1967 | Zimberoff | 396/14 |
| 4,031,640 A | * | 6/1977 | Hanna et al. | 283/77 |
| 4,060,819 A | * | 11/1977 | Bahnsen | 396/419 |
| 4,268,155 A | * | 5/1981 | Lehnert et al. | 396/419 |
| 4,385,459 A | * | 5/1983 | McGrath et al. | 40/730 |
| 5,104,592 A | | 4/1992 | Hull et al. | |
| 5,218,403 A | * | 6/1993 | Smith | 355/39 |
| 5,331,419 A | | 7/1994 | Yamada et al. | |
| 5,787,616 A | | 8/1998 | Rogers | |
| 6,880,277 B2 | | 4/2005 | Kaminski | |
| 6,891,148 B1 | | 5/2005 | Rivera et al. | |
| 7,194,200 B1 | * | 3/2007 | Behlow | 396/5 |
| 2005/0089214 A1 | | 4/2005 | Rubbert et al. | |

FOREIGN PATENT DOCUMENTS

JP 403002505 1/1991

* cited by examiner

Primary Examiner—Christopher Mahoney
(74) Attorney, Agent, or Firm—Bowman Green Hampton & Kelly, PLLC

(57) ABSTRACT

A camera mount, comprising a camera mounting portion, wherein a camera can be removably coupled to the camera mounting portion, such that a photographic plane of the camera is parallel to a photographic plane of the camera mounting portion; a rail portion, wherein the rail portion extends from the camera mounting portion substantially perpendicular to the photographic plane of the camera mounting portion; and a frame, wherein the frame is adapted to receive one or more reference scales such that a photographic plane of the one or more reference scales is parallel to a photographic plane of the camera mounting portion, and wherein the frame is coupled to the rail portion such that a photographic plane of the frame is parallel to a photographic plane of the camera mounting portion elements.

24 Claims, 5 Drawing Sheets

DEVICE TO REDUCE ANGULAR DISTORTION IN PHOTOGRAPHY

CROSS-REFERENCE TO RELATED APPLICATIONS

This nonprovisional patent application claims the benefit of U.S. Provisional Patent Application Ser. No. 60/654,143, filed Feb. 18, 2005, the disclosure of which is incorporated herein by reference.

BACKGROUND OF THE INVENTION

1. Field of the Invention

The present invention relates to a device to reduce distortion in photogrammetry. More specifically, the present invention is drawn to a device that reduces or eliminates distortion in forensic photography.

2. Description of Related Art

Photogrammetry is the art or science of obtaining reliable measurements by means of photography. Some categories of photography may use a reference or object within the photographed field to give context to the object or location photographed. For example, in forensic photography of evidence, a physical reference scale aids in showing the size, dimension, or orientation of the item photographed. This is sometimes referred to as a category of forensic, close in photogrammetry.

Forensic photography is used in both civil and criminal proceedings, where the accuracy of recording relevant information is important. The U.S. Federal Bureau of Investigation (FBI) specifies use of an L-shaped reference scale that has a 30 cm long first arm and a 15 cm long second arm, each having a 15 cm straight scale. The scales are graduated and alternate in black and white for visibility. This "Bureau" reference set is sometimes referred to as the photomacrographic scale set.

Crimes that involve bitemarks show dramatically the difficulty of photographing evidence consistently and accurately, in that a bitemark is a difficult subject to photograph. A bitemark is commonly defined as a physical change in an object caused by its contact with the biter's teeth. In other words, a bitemark is the representative pattern left in a bitten object or tissue, which is caused by the impression of the dental structure of the biting animal or person. A typical human bitemark is an oval patterned injury having two opposing, U-shaped arches, separated at their bases where the upper and lower jaws come together. On the edges of the arches may be additional abrasions, contusions, or lacerations caused by the teeth.

Bitemark characteristics can be used to identify the biter. The characteristics of bitemarks fall into "class" and "individual" characteristics. Class characteristics are common to a group, and can be used to distinguish groups, such as a bitemark of a child from a bitemark of an adult. Individual characteristics differentiate between individuals and may lead to the identity of the specific biter or perpetrator. The number, specificity, and accuracy of reproduction of individual characteristics within a bitemark improve the confidence of bitemark identification.

Odontology is the study of the structure, development, and abnormalities of teeth. When applied to forensics, odontology (or forensic dentistry) includes the legal, evidentiary aspects of investigative dentistry, such as the study of bitemark characteristics with the object of ascertaining the facts surrounding a biting. Thus, odontology is a specialized role in effective crime scene investigation.

An early step in processing the evidence of any crime scene is to photograph the scene using still photography and other visual media. The standards for photographic documentation of a bitemark are provided within the American Board of Forensic Odontology (ABFO) Bitemark Analysis Guidelines. According to the guidelines, photography is preferably performed under an odontologist's direction to ensure accurate and complete documentation of the bite site.

Bitemark analysis guidelines state that an ABFO No. 2 metric scale should be used in order to demonstrate, within the photographs, the size and spatial relationship of bitemark characteristics. The ABFO No. 2 metric scale features both linear and circular graduations in the horizontal and vertical directions. Three crosshair circles aid in compensating for distortion from oblique camera angles. Contrasting measuring bars, 18% gray scale, and the L-shape further enable odontologists to analyze the relative location, size, and orientation of the characteristics of a bitemark from a photograph.

Correct placement of the ABFO No. 2 scale is critical to accurate photographic recordation of bitemark characteristics. The L-shaped scale should be situated on the same plane and adjacent to the bitemark. The critical close-up photographs should be taken in a manner that eliminates distortion that could interfere with a determination of the characteristics of the bitemark.

For example, when the ABFO No. 2 scale and the injury are on the same plane, but the camera angle is not perpendicular to that plane, then the resulting photograph will be subject to angular distortion. Inaccurate positioning of the bite site, the camera, or the ABFO No. 2 scale can create perspective and parallax distortion of the captured image. With such distortion, otherwise similar photographs may show different photogrammetric characteristics.

There are four general types of photographic distortion associated with L-shaped forensic scales. If any photographic distortion exists, it must be corrected before a meaningful comparison analysis can be accomplished. If the image is severely distorted, the distortion may not be correctable and the photograph(s) may not be useable and the subject matter must be re-photographed. Unfortunately, physical evidence is often short-lived, fragile, or transitory in nature and a second photographic opportunity will not be available.

The first type of photographic distortion, Type I angular distortion, occurs when a scale is positioned parallel to the plane of the photographic subject, but the camera is not perpendicular to the plane of the scale and the photographic subject. For example, the scale and bite mark are co-planar, but the plane of the camera back is not parallel to the plane of the scale and bite mark.

The second type of photographic distortion, Type II distortion, occurs when the scale is not in the same plane as the photographic subject (i.e., the bite mark). Thus, the proportions of the photographic subject (i.e., the injury pattern) are not accurately ascertainable.

The third type of photographic distortion, Type III distortion, occurs when one leg of a two-dimensional scale has perspective distortion but the other leg does not. Again, the proportions of the photographic subject (i.e., the injury pattern) are not accurately ascertainable.

The fourth type of photographic distortion, Type IV distortion, occurs when the scale itself is skewed. For example, a portion of the scale is bent, twisted, or curled.

While these are not the only types of potential photographic distortion, these encompass most of the physical distortion seen in evidentiary photographs, such as, for example, bite mark photographs.

The bitemark photographs are recorded within the crime scene photographic log, and become part of the descriptive evidence of the crime scene. The close-up bitemark photographs are important to enable subsequent analysis of the bitemark characteristics by an odontologist.

During analysis of the bitemark photographs, the odontologist will determine a number of facts regarding the bitemark, such as anatomical location, surface and skin characteristics, underlying structure, the shape of the bitemark, (e.g. essentially round, ovoid, crescent, etc.), color, size (i.e., vertical and horizontal dimensions of the bitemark), types of injuries (e.g., petechial hemorrhage, contusions, incisions, etc.), position of maxillary and mandibular arches, location and position of individual teeth, intradental characteristics, etc. The forensic odontologist will then compare the bitemark characteristics from the crime scene with photographs, plaster casts, and/or other evidence from examination of a suspect, which typically includes the results of an intra-oral examination.

Frequently, however, an odontologist is not among the first responders to perform the photographic recordation of a crime scene. Access to the victim after the crime may also be limited for a variety of reasons. Thus, a first responder, who may have minimum photographic training and possibly none in bitemark photography, may be required to photograph the bitemark. Depending on the nature of the incident and sensitivity of the occurrence, the first responder may have limited time to record the bitemark characteristics correctly.

The wide angle orientation photograph may well be within the capability of a first responder trained in general photography. However, the first responder may be unfamiliar with the peculiar requirements for close-up photography of a bitemark. In particular, a first responder is unlikely to have sufficient training in the proper use of the ABFO #2 scale to accurately record the bitemark characteristics. Unfortunately, this can lead to distortion, unreliable photographs, and nonstandard characterization of the bitemark.

SUMMARY OF THE INVENTION

In photography, a scale is included in the photographed field to provide an accurate reference to show the characteristics or size of the item being photographed. Improper orientation of the scale and camera, in relation to the item being photographed, may introduce distortion or inaccuracy.

There is a general need for improving the standardization of photographic records of evidence. In particular, the standard handling of photographic scales may eliminate distortion, improve the accuracy of photographic evidence, and enhance its usefulness in photogrammetry. For bitemark cases in particular, the reduction of distortion would improve evidence quality, completeness, reliability, and validity of bitemark documentation.

Therefore, the present invention relates generally to a device for reducing distortion in photogrammetry. In an illustrative, non-limiting embodiment of this invention, the present invention is drawn to a device for use in photography, whether conventional, digital, or video, which may be used to reduce or eliminate distortion in forensic photography, including forensic dentistry or odontology.

In an illustrative, non-limiting embodiment of this invention, the forensic photo frame comprises at least some of a frame that is adapted to define at least a portion of a field of photographic capture, which is fixed with reference to a camera. The frame is also adapted to provide a fixed relationship of one or more reference scales within the field of photographic capture.

Accordingly, this invention provides a forensic photo frame, which reduces distortion in photogrammetry.

This invention separately provides a forensic photo frame, which reduces or eliminates the distortion associated with each of the four general types of distortion associated with the use of forensic scales.

This invention separately provides a forensic photo frame, which provides improved photographic accuracy and reliability, such that the resulting photographs are more valuable for any subsequent analysis.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein:

FIG. 3b shows a rear view of the first exemplary embodiment of the photo frame of FIG. 3a;

FIG. 4b shows a rear view of the second exemplary embodiment of the photo frame of FIG. 4a;

FIG. 5b shows a rear view of the third exemplary embodiment of the photo frame of FIG. 5a.

DETAILED DESCRIPTION OF AN EXEMPLARY EMBODIMENT

Figure 1:
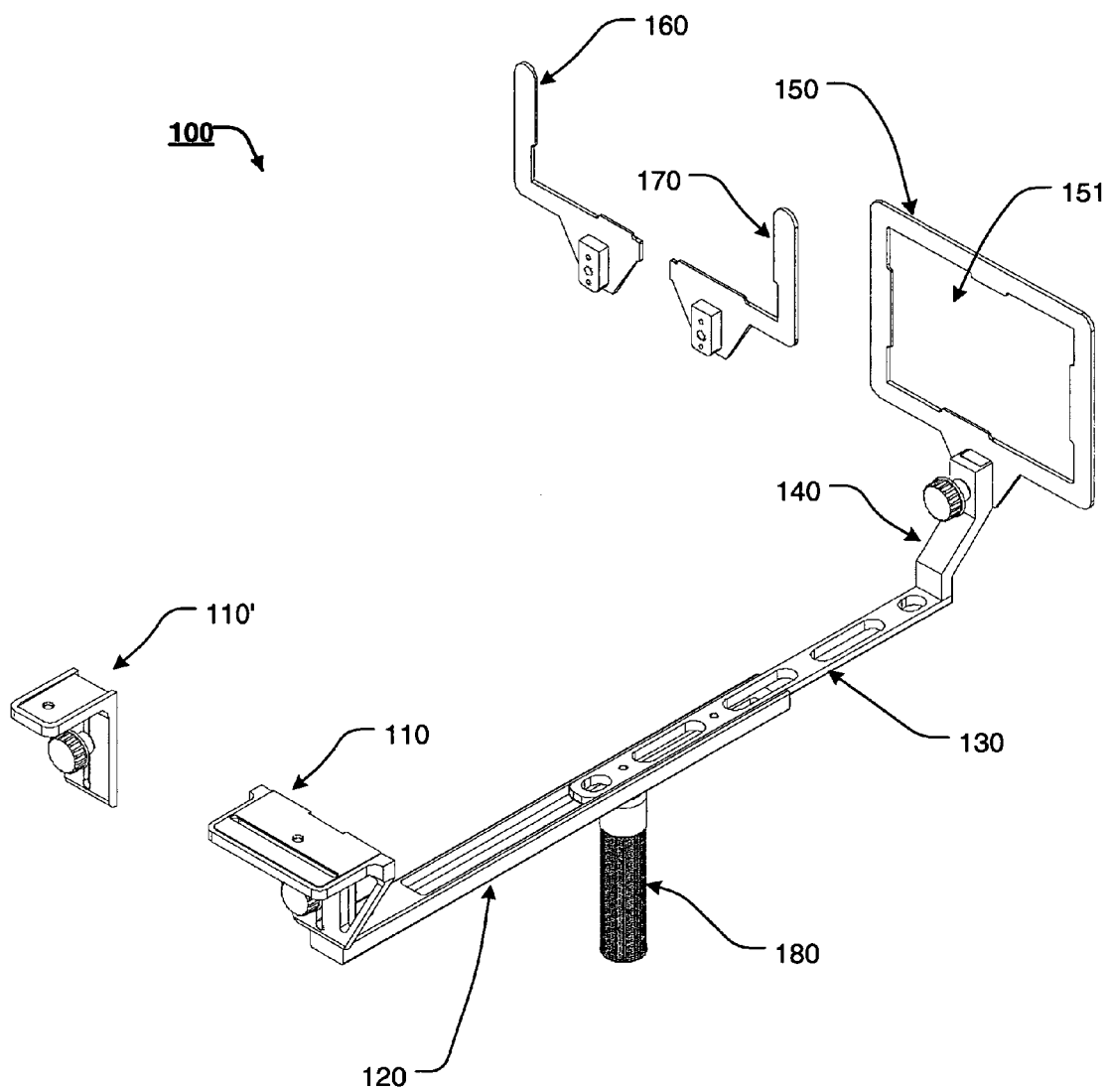
FIG. 1 shows a rear perspective view of a first exemplary embodiment of a forensic photo frame according to this invention.

For simplicity and clarification, the design factors and operating principles of the forensic photo frame of this invention are explained with reference to various exemplary embodiments of a forensic photo frame according to this invention. The basic explanation of the design factors and operating principles of the forensic photo frame is applicable for the understanding, design, and operation of the forensic photo frame of this invention.

The present invention is a device to reduce or eliminate photographic distortion associated with the use of forensic scales; accordingly, it is applicable to a broad range of photography. Any photographic image that requires correct perspective to a scale can benefit from the forensic photo frame of this invention. Evidentiary photography, however, is a clear example of a field where the need for accuracy is compelling because such photographs may be used for forensic photogrammetry in criminal or civil proceedings. For bitemark photography, the need for accuracy and low distortion is particularly compelling as the subject matter is difficult to analyze.

It should be appreciated that, for simplicity and clarification, the exemplary embodiments of this invention are described with reference to an embodiment useful for bitemark photography. However, this embodiment should be considered merely exemplary and it should be understood that the invention is applicable to a wide range of photographic applications using reference scales. In addition, the present invention may be adapted to a wide variety of camera equipment.

Before describing variations of the present invention in detail, first, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims made herein. Also, it is contemplated that any optional feature of the inventive variations described herein may be set forth and claimed independently, or in combination with any one or more of the features described herein.

Unless defined otherwise, all technical and scientific terms used herein have the same meaning as commonly understood by one of ordinary skill in the art to which this invention belongs. However, it should be appreciated that exemplary, non-limiting methods and materials are described herein and any methods and/or materials similar or equivalent to those described herein can be used in practicing the present invention.

Also, it is noted that as used herein and in the appended claims, the singular forms "a", "and", "said", and "the" include plural referents unless the context clearly dictates otherwise. Conversely, it is contemplated that the claims may be drafted to require singular elements or exclude any optional element indicated to be so here in the text or drawings.

Figure 2:
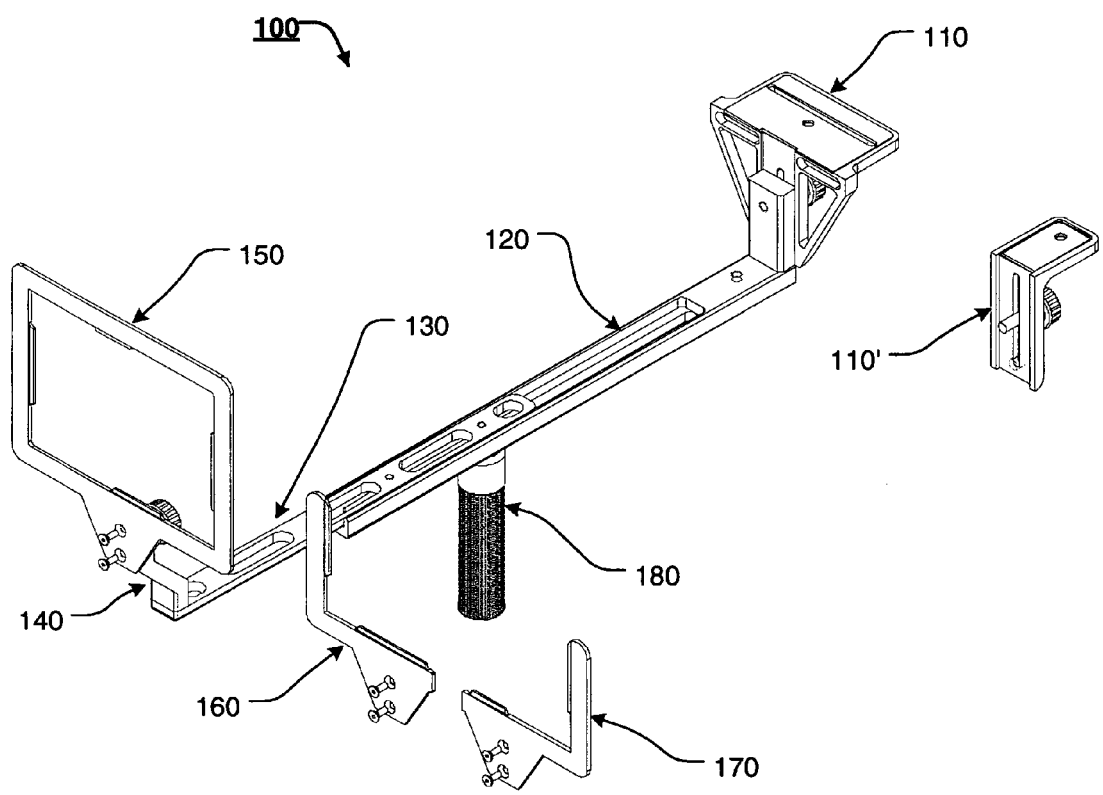
FIG. 2 shows a front perspective view of the first exemplary embodiment of the forensic photo frame of FIG. 1.

Turning now to the drawing figures, FIG. 1 shows a rear perspective view of a first exemplary embodiment of a forensic photo frame 100 according to this invention, while FIG. 2 shows a front perspective view of the first exemplary embodiment of the forensic photo frame 100 of FIG. 1. As shown in FIGS. 1 and 2, the forensic photo frame 100 comprises at least some of a camera mounting portion 110, a first rail portion 120, a second rail portion 130, an optional frame mounting portion 140, a frame 150, and an optional handle 180.

In various exemplary embodiments, the camera mounting portion 110 comprises a bracket adapted to removably secure a camera that is appropriate for use in the application. The camera mounting portion 110 allows a camera to be removably coupled to the camera mounting portion 110, such that a photographic plane of the camera is substantially parallel to a photographic plane of the camera mounting portion 110.

The camera mounting portion 110 may take a variety of configurations, and is shown in FIGS. 1 and 2 as both an optional large camera mounting portion 110 and an optional small camera mounting portion 110'.

It should be appreciated that the term camera mounting portion is to be given its broadest meaning and that the particular form that the camera mounting portion 100 takes is a design choice based on the desired appearance and/or functionality of the camera mounting portion 100. Likewise, it should also be appreciated that an appropriate means for coupling a camera to the camera mounting portion may include a knurled knob fastener, a threaded mounting portion, any one of a variety of quick release mechanisms, or any other known or later developed means for coupling a camera to the camera mounting portion. These will be well known to and understood by those of ordinary skill in the art.

In various exemplary embodiments, the camera mounting portion 110 may include a spring-biased pin (not shown) that corresponds to an appropriate receiving detent in the body of a camera to be placed on the camera mounting portion 110. When accepted into the receiving detent, the pin, if included, operates to further align the camera with the forensic photo frame 100.

In various exemplary embodiments, the camera mounting portion 110 is adapted to engage the first rail portion 120. In various exemplary embodiments, the camera mounting portion 110 is adapted to be removably coupled to the first rail portion 120, while in other exemplary embodiments, the camera mounting portion 110 is formed as an integral portion of the first rail portion 120.

In various exemplary embodiments, the camera mounting portion 110 may slideably engage the first rail portion 120 and lock into rigid connection, or otherwise rigidly couple to the first rail portion 120 in any manner known in the art. In various exemplary embodiments, the camera mounting portion 110 allows a camera (not shown) to be adjusted in any plane with respect to the first rail portion 120. In this manner, the camera (not shown) may be moved up, down, right, left, forward, or backward, to alter the photographic field of a camera, with respect to the first rail portion 120. This allows a photographer to center the camera lens on an object to be photographed, and then lock the camera into a secured position.

The first rail portion 120 extends from the camera mounting portion 110 substantially perpendicular to the photographic plane of the camera mounting portion 110 and substantially perpendicular to a plane formed by a photographic plane of a camera coupled to the camera mounting portion 110. The length of the first rail portion 120 is a design choice based on a desired focal length and/or other desired function characteristics of the forensic photo frame 100.

The second rail portion 130 is slideably coupled to the first rail portion 120, such that the second rail portion 130 may be locked into rigid connection with the first rail portion 120 at one of a plurality of locations. In this manner, the first rail portion 120 and the second rail portion 130 operate to create a rigid, adjustable, telescoping rail portion. The first rail portion 120 is slideably and longitudinally engaged with the second rail portion 130, such that the overall length of the rail portion may be adjusted and set to a distance suitable for photography.

Alternatively, the function of the first rail portion 120 and the second rail portion 130 may be supplied by any telescoping structure with sufficient rigidity to maintain the camera in proper orientation with the frame 150, such as nesting tubes or poles.

In various exemplary embodiments, the first rail portion 120 and the second rail portion 130 comprise a single, fixed length rail portion.

The frame mounting portion 140 comprises a bracket adapted to couple the second rail portion 130 to the frame 150. The frame mounting portion 140 is adapted to mount or support the frame 150 and allow the frame 150 to be positioned in a desired portion of the photographic field of a camera coupled to the camera mounting portion 110.

In various exemplary embodiments, the frame mounting portion 140 is adapted to engage the second rail portion 130. In various exemplary embodiments, the frame mounting portion 140 is adapted to be removably coupled to the second rail portion 130, while in other exemplary embodiments, the frame mounting portion 140 is formed as an integral portion of the second rail portion 130.

The frame mounting portion 140 may take a variety of configurations, and in various exemplary embodiments, the frame mounting portion 140 is formed so as to allow the frame 150 to extend beyond a terminating end of the second rail portion 130.

The frame 150 provides a defined aperture or opening within at least a portion of the photographic field of the camera and provides a frame for receiving one or more reference scales, such that a photographic plane of the one or more reference scales is parallel to a photographic plane of the frame 150. The frame 150 reinforces or braces such scales, which reduces or eliminated certain types of potential photographic distortion.

In various exemplary embodiments, the frame 150 is adapted to engage the frame mounting portion 140. In various exemplary embodiments, the frame 150 is adapted to be removably coupled to the frame mounting portion 140, while in other exemplary embodiments, the frame 150 is formed as an integral portion of the frame mounting portion 140.

In various other exemplary embodiments, the frame 150 is adapted to engage the second rail portion 130 and the frame mounting portion 140 is not included. In various exemplary embodiments, the frame 150 is adapted to be removably coupled to the second rail portion 130, while in other exemplary embodiments, the frame 150 is formed as an integral portion of the second rail portion 130.

In certain exemplary embodiments, the frame 150 may be adjustable with respect to the frame mounting portion 140 and/or the second rail portion 130.

The frame mounting portion 140 is adapted to receive a variety of differently shaped frames, such as, for example, frame 150, frame 160, or frame 170, as illustrated in FIGS. 1-5.

Frame 150, frame 160, and frame 170 are each scale holders that attach to the frame mounting portion 140, as described above. Exemplary frame 150, frame 160, and frame 170 are each designed to hold photographic scales (not shown in FIG. 1 or 2), such that when an object to be photographed is situated within the center of frame 150, the reference scale is properly positioned. The frame 150, 160, or 170 is formed such that at least one reference scale may be positioned onto and removed from the frame 150, 160, or 170 without damaging the reference scale.

As shown in FIGS. 1-5, the photographic scales are adhesively affixed to the frame 150, 160, or 170, by means of tabs 152, 162, and 172, respectively. However, it should be appreciated that the photographic scales may be affixed to the frame 150, 160, or 170, by any other appropriate means known to those skilled in the art, such as spring clips, recessed slots, magnetic attraction, hook and loop fasteners, locking annular slots, and the like.

The handle 180 is capable of depending from either the first rail portion 120 or the second rail portion 130. When the handle 180 is fixed to the second rail portion 130, the handle 180 may be used to slide or position the second rail portion 130 with respect to the first rail portion 120. The handle 180 may also lock the second rail portion 130 and the first rail portion 120 together by means of an internal screw and riding nut or other means known in the art.

In various other exemplary embodiments, the first rail portion 120, the second rail portion 130, or the handle 180 may include an optional adaptor for mounting the forensic photo frame 100 onto a tripod or other structure.

The elements of the forensic photo frame 100 may be manufactured from a variety of materials, and the material of construction of individual parts may vary. Portions of the forensic photo frame 100 should be of a material that is sufficiently rigid to ensure precise orientation between the camera and the frame 150, 160, or 170.

In various exemplary embodiments, elements of the forensic photo frame 100 may be comprised of anodized aluminum, as anodized aluminum has shown to be relatively light weight and sufficiently rigid. If needed for evidentiary uses, such a material may be amenable to heat, gas, or cold sterilization, and would survive treatment in an autoclave. In various exemplary embodiments, cork may be used in points of fastening between parts to permit firm connection. Depending on the means used to hold the reference scales, the contact points with the reference scales may include fabric or rubber such that the scales fit securely in position.

When in use, a camera mounted to the camera mounting portion 110 can be finely positioned on the camera mounting portion 110 to center the frame 150 in the photographic field of the camera.

The photographer may then place the frame 150 in the same plane as the object desired to be photographed as follows. For embodiments mounted on a tripod, the handle 180 enables the photographer to slide the second rail portion 130 to position the frame 150 in the correct plane while the camera, the camera mounting portion 110, and the first rail portion 120 remain in position. The handle 180 or other locking means may lock the first rail portion 120 and the second rail portion 130 in position.

In portable embodiments, the photographer sets the approximate distance desired by using the handle 180 to slide the second rail portion 130 along the first rail portion 120, locks the rails in position with the handle 180 or other locking means, and uses the handle 180 to orient the frame 150 in the proper plane with respect to the both the subject matter (i.e., the bitemark), thereby positioning the camera as well.

In the example of odontology, the frame 150, with the one or more attached ABFO No. 2 or other L-shaped reference scales, would be placed in the same plane as a bitemark, with the frame 150 centered on the portion of the desired photographic field. Images that are captured in this manner, using the forensic photo frame 100, will have little or no distortion.

While the actual method of use will vary, depending on the particular embodiment and the application, a single photographer may use the forensic photo frame 100 with relative ease.

Figure 3A:
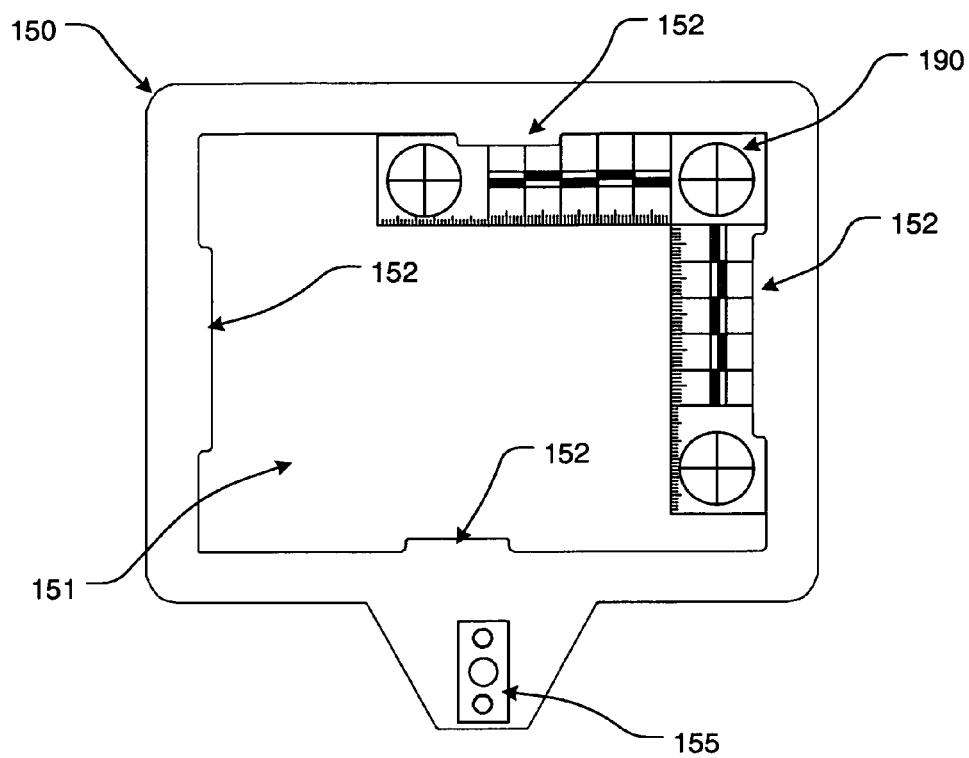
FIG. 3a shows a front view of a first exemplary embodiment of a photo frame according to this invention.
Figure 3B:
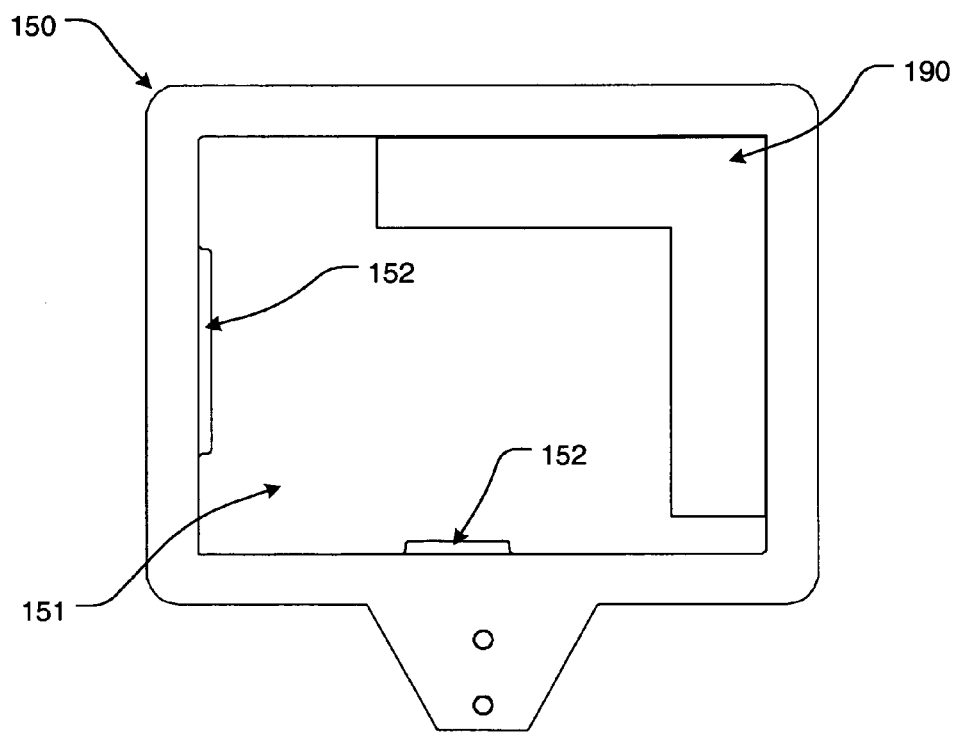

FIG. 3a shows a front view of a first exemplary embodiment of a photo frame 150, while FIG. 3b shows a rear view of the first exemplary embodiment of the photo frame 150. As shown in FIGS. 3a and 3b, the frame 150 comprises an aperture 151 defined by a generally rectangular frame. The frame 150 further comprises a plurality of tabs 152 extending into the aperture 151.

In various exemplary embodiments, the thickness of each tab 152 is less than the thickness of the portion of the frame 150 that defines the aperture 151. In certain exemplary embodiments, the thickness of each tab 152 is less than the thickness of the portion of the frame 150 that defines the aperture 151 the thickness of the reference scale that is to be employed with the frame 150 and optionally the thickness of any means employed to couple the reference scale to the frame 150. Furthermore, in various exemplary embodiments, the tabs 152 are positioned towards a front side of the frame 150. In this manner, when a reference scale is coupled to the frame 150, the reference scale does not extend beyond the rear surface of the frame 150.

In various exemplary embodiments, a reference scale may be coupled to the frame 150, and more specifically at least one of the tabs 152, via an adhesive. Alternatively, a reference scale may be coupled to the frame 150, and more specifically at least one of the tabs 152, via any other appropriate means known to those skilled in the art, such as, for example, spring clips, recessed slots, magnetic attraction, hook and loop fasteners, locking annular slots, and the like.

As shown in FIGS. 3a and 3b, an exemplary L-shaped reference scale 190, similar to the known ABFO No. 2 scale is shown coupled to the frame 150.

As further shown in FIGS. 3a and 3b, the frame 150 comprises an attachment means 155. The attachment means 155 allows the frame 150 to engage and be coupled to a corresponding attachment means of the frame mounting portion 140 or the second rail portion 130, as described above.

Figure 4A:
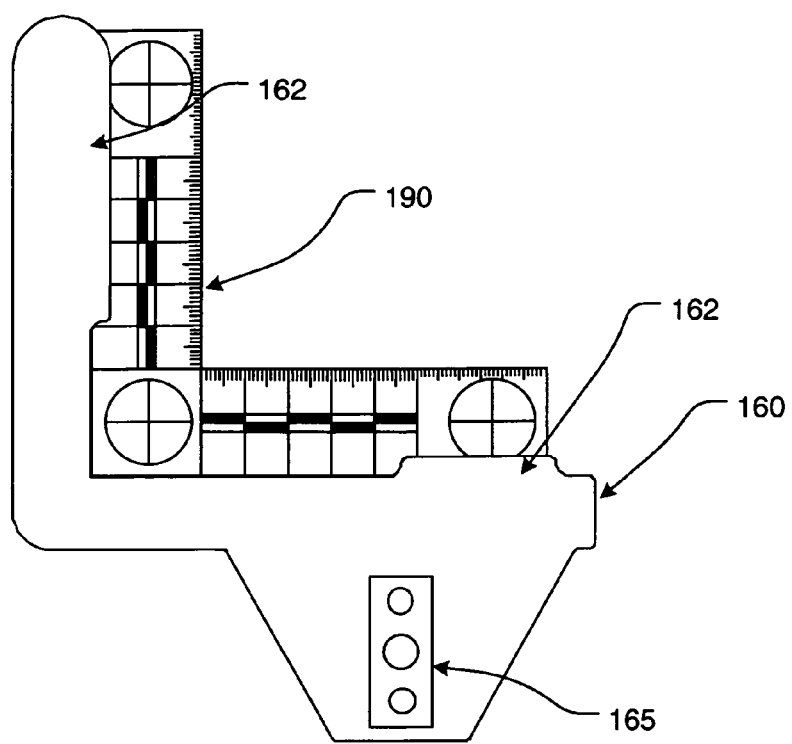
FIG. 4a shows a front view of a second exemplary embodiment of a photo frame according to this invention.
Figure 4B:
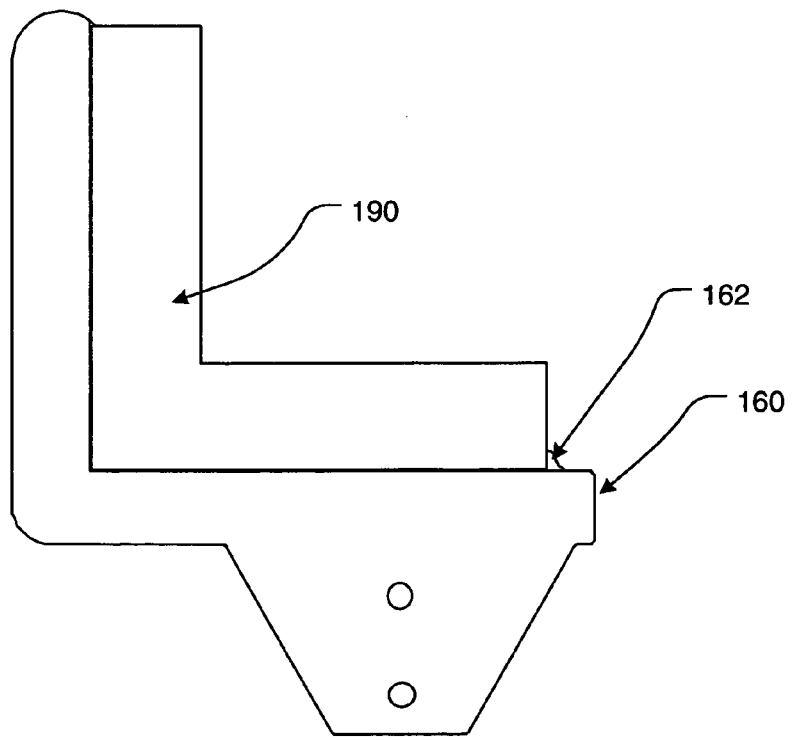

FIG. 4a shows a front view of a second exemplary embodiment of a photo frame 160, while FIG. 4b shows a rear view of the second exemplary embodiment of the photo frame 160. As shown in FIGS. 4a and 4b, the frame 160 comprises a plurality of tabs 162 and an attachment means 165.

It should be understood that each of these elements, if included, corresponds to and operates similarly to the tabs 152 and the attachment means 155, as described above with reference to FIGS. 1-3b.

However, as shown in FIGS. 4a and 4b, the frame 160 does not include an aperture, but is substantially "L" shaped, when viewed from the front. In this manner, the frame 160 is able to accommodate an exemplary L-shaped reference scale 190, similar to the known ABFO No. 2 scale.

Figure 5A:
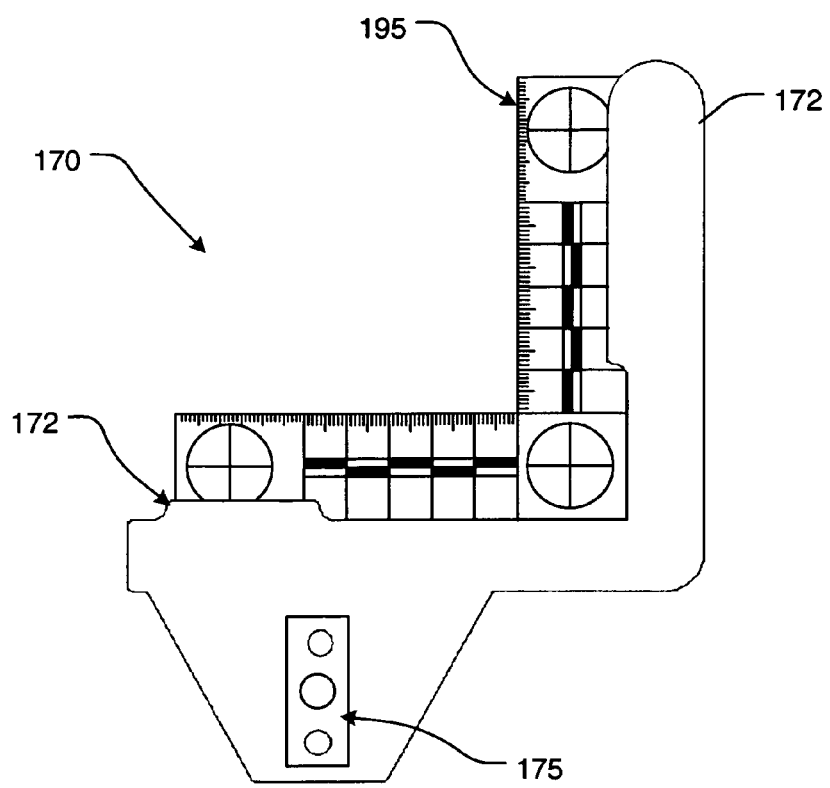
FIG. 5a shows a front view of a third exemplary embodiment of a photo frame according to this invention.
Figure 5B:
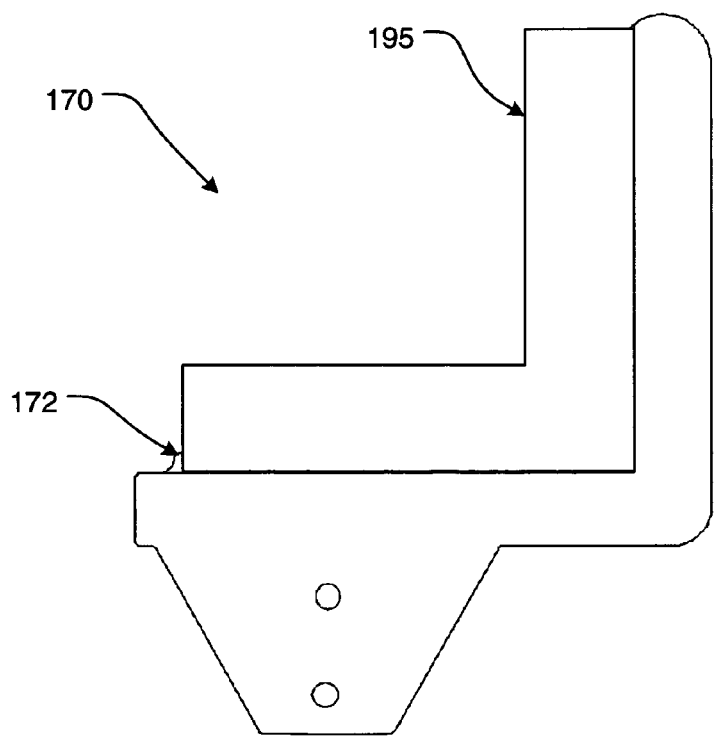

FIG. 5a shows a front view of a second exemplary embodiment of a photo frame 170, while FIG. 5b shows a rear view of the second exemplary embodiment of the photo frame 170. As shown in FIGS. 5a and 5b, the frame 170 comprises a plurality of tabs 172 and an attachment means 175.

It should be understood that each of these elements, if included, corresponds to and operates similarly to the tabs 162 and the attachment means 165, as described above with reference to FIGS. 4a-4b.

However, as shown in FIGS. 5a and 5b, the frame 170 is substantially "L" shaped, when viewed from the rear. In this manner, the frame 170 is able to accommodate an exemplary L-shaped reference scale 195, similar to the known ABFO No. 2 scale.

While this invention has been described in conjunction with the exemplary embodiments outlined above, it is evident that many alternatives, modifications, and variations will be apparent to those skilled in the art. For example, those skilled in the art will readily see that the invention is suitable for a wide range of reference scales and applications. For instance, in the event use is contemplated with the photomacrographic scale set, the frame 150, 160, or 170 may easily be designed for the different dimensions of, for example, the FBI's L-shaped scale. The first rail portion 120 and/or the second rail portion 130 may comprise longer members so as to be extendable to accommodate the typically larger distances involved in photographing general evidence. Thus, the present invention could be readily adapted for use in photographing foot prints, tire prints, pattern injuries, or gun shot wounds.

It should be appreciated that, for simplicity and clarification, the exemplary embodiments of this invention are described with reference to the frame comprising a closed or L-shaped frame portion. However, these embodiments should be considered merely exemplary and it should be understood that the frame may comprise a closed frame portion, an L-shaped frame portion, a U-shaped frame portion, a T-shaped frame portion, or a frame portion that is shaped to specifically accommodate a particular scale or scale portion. In addition, a scale or scale portion may be permanently etched in or applied to the frame.

Such adaptations and modifications should and are intended to be comprehended within the meaning and range of equivalents of the disclosed exemplary embodiments. It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. A camera mount, comprising:
   a camera mounting portion, wherein a camera can be removably coupled to the camera mounting portion, such that a photographic plane of the camera is parallel to a photographic plane of the camera mounting portion;
   a rail portion, wherein the rail portion extends from the camera mounting portion substantially perpendicular to the photographic plane of the camera mounting portion, and wherein the rail portion comprises a first rail portion and a second rail portion;
   a handle, wherein the handle is capable of depending from either the first rail portion or the second rail portion, and wherein the handle may be used to lock the second rail portion and the first rail portion together; and
   a frame, wherein the frame is adapted to receive one or more reference scales such that a photographic plane of the one or more reference scales is parallel to a photographic plane of the camera mounting portion, and wherein the frame is coupled to the rail portion such that a photographic plane of the frame is parallel to a photographic plane of the camera mounting portion elements.

2. The camera mount of claim 1, wherein the camera can be removably coupled to the camera mounting portion via one of a knurled knob fastener, a threaded mounting portion, a quick release mechanisms, or its equivalent.

3. The camera mount of claim 1, wherein the camera mounting portion is removably coupled to the rail portion.

4. The camera mount of claim 1, wherein the camera mounting portion is formed as an integral portion of the rail portion.

5. The camera mount of claim 1, wherein the first rail portion is slideably coupled to the second rail portion.

6. The camera mount of claim 1, wherein the first rail portion is slideably coupled to the second rail portion, such that the first rail portion may be locked into rigid connection with the second rail portion at one of a plurality of locations.

7. The camera mount of claim 6, wherein the camera mounting portion is removably coupled to the first rail portion.

8. The camera mount of claim 6, wherein the camera mounting portion is formed as an integral portion of the first rail portion.

9. The camera mount of claim 1, wherein the rail portion comprises a telescoping structure.

10. The camera mount of claim 1, wherein the frame comprises a substantially closed, rectangular frame portion, wherein the rectangular frame portion defines an aperture.

11. The camera mount of claim 1, wherein the frame comprises a substantially L-shaped frame portion.

12. The camera mount of claim 1, wherein the frame comprises a substantially U-shaped frame portion.

13. The camera mount of claim 1, wherein the frame comprises a frame portion that is shaped to specifically accommodate a particular scale or scale portion.

14. The camera mount of claim 1, wherein the frame comprises a scale or scale portion permanently etched in or applied to the frame.

15. The camera mount of claim 1, wherein the frame is removably coupled to the rail portion.

16. The camera mount of claim 1, wherein the frame is formed as an integral portion of the rail portion.

17. The camera mount of claim 1, wherein the frame comprises at least one tab adapted to couple at least one reference scale to the frame.

18. The camera mount of claim 17, wherein a thickness of each tab is less than a thickness of the frame, such that when a reference scale is coupled to the frame, via the at least one tab, the reference scale does not extend beyond the rear surface of the frame.

19. The camera mount of claim 1, wherein the at least one reference scale is coupled to the frame via at least one of an adhesive, spring clips, recessed slots, magnetic attraction, hook and loop fasteners, locking annular slots, or its equivalent.

20. The camera mount of claim 1, wherein the frame is coupled to the rail portion via a frame mounting portion.

21. The camera mount of claim 20, wherein the frame is formed as an integral portion of the frame mounting portion.

22. The camera mount of claim 20, wherein the frame mounting portion is removably coupled to the rail portion.

23. The camera mount of claim 20, wherein the frame mounting portion is formed as an integral portion of the rail portion.

24. The camera mount of claim 1, further comprising a handle, wherein the handle is removably coupled to the rail portion.

* * * * *